(12) United States Patent
Mohammad et al.

(10) Patent No.: US 11,809,250 B2
(45) Date of Patent: Nov. 7, 2023

(54) WORKLOAD AWARE POWER LIMITING AND MULTIPLE-INPUT MULTIPLE-OUTPUT CONTROL

(71) Applicant: Intel Corporation, Santa Clara, CA (US)

(72) Inventors: Ali Mohammad, Hillsboro, OR (US); Asma Al-Rawi, Hillsboro, OR (US); Ujjwal Gupta, Hillsboro, OR (US); Federico Ardanaz, Hillsboro, OR (US); Jonathan Eastep, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 146 days.

(21) Appl. No.: 17/074,288

(22) Filed: Oct. 19, 2020

(65) Prior Publication Data

US 2021/0124404 A1 Apr. 29, 2021

Related U.S. Application Data

(60) Provisional application No. 62/927,611, filed on Oct. 29, 2019.

(51) Int. Cl.
*G06F 1/28* (2006.01)
*G06F 1/3296* (2019.01)
*G06N 20/00* (2019.01)
*G06F 1/3206* (2019.01)
*G06F 1/324* (2019.01)

(52) U.S. Cl.
CPC .............. *G06F 1/28* (2013.01); *G06F 1/3296* (2013.01); *G06N 20/00* (2019.01)

(58) Field of Classification Search
CPC .......... G06F 1/28; G06F 1/3296; G06N 20/00
See application file for complete search history.

(56) References Cited

U.S. PATENT DOCUMENTS

| | | | |
|---|---|---|---|
| 8,429,431 B2 * | 4/2013 | Malik | G06F 1/324 713/340 |
| 10,948,957 B1 * | 3/2021 | Chaouat | G06F 1/3206 |
| 2009/0271046 A1 * | 10/2009 | Lewis | G06F 11/30 713/340 |
| 2010/0268930 A1 * | 10/2010 | Bose | G06F 11/3062 713/340 |
| 2011/0185203 A1 * | 7/2011 | Carlson | G06F 1/3206 713/320 |

(Continued)

*Primary Examiner* — Jaweed A Abbaszadeh
*Assistant Examiner* — Gayathri Sampath
(74) *Attorney, Agent, or Firm* — Schwabe, Williamson & Wyatt, P.C.

(57) ABSTRACT

A scheme to improve performance of power-constrained computers, comprising a heterogeneous mix of compute elements, by dynamically reacting to changes in the switching capacitance that present workload induces in each heterogeneous compute element and learning the coefficients of a power-frequency model for each compute element for the present workload. At each time step, the scheme forecasts a maximum frequency that the compute element can run at without exceeding an input power limit for a given workload. The scheme rapidly re-learns coefficients of the power model and rapidly adapts the frequency as the workload's characteristics shift ensuring that compute elements run at the maximum frequency they can while not exceeding the input power limit.

20 Claims, 6 Drawing Sheets

(56) References Cited

U.S. PATENT DOCUMENTS

| | | | | |
|---|---|---|---|---|
| 2013/0024713 A1* | 1/2013 | Bajic | ........................ | G06F 1/324 |
| | | | | 713/340 |
| 2017/0205863 A1* | 7/2017 | Lee | ........................ | G06F 1/3206 |
| 2019/0332157 A1* | 10/2019 | Hsu | ........................ | G06F 1/324 |
| 2020/0050920 A1* | 2/2020 | Idgunji | .................. | G06N 3/082 |

* cited by examiner

WORKLOAD AWARE POWER LIMITING AND MULTIPLE-INPUT MULTIPLE-OUTPUT CONTROL

CLAIM OF PRIORITY

This application claims priority to U.S. Provisional Patent Application No. 62/927,611 titled "WORKLOAD AWARE POWER LIMITING AND MULTIPLE-INPUT MULTIPLE-OUTPUT CONTROL," filed Oct. 29, 2019, which is incorporated by reference herein.

BACKGROUND

Current central processing units (CPUs), graphical processing units (GPUs), and other compute elements select a maximum frequency that the cores within them can run at while not exceeding an overall input power limit. However, such techniques to select a maximum frequency produce long excursions over or under an input power limit. Excursions over the limit are undesirable in systems because the bigger the excursions, the more expensive the power delivery infrastructure must be to tolerate them. Unmitigated over-excursions cause voltage regulators to fail over time leading to hardware errors. Unmitigated over-excursions can also cause circuit breakers to trip in a data center, and this leads to power outages, which may be visible to end users of a computer or data center. Excursions under the limit are undesirable because a compute element runs at a frequency below an ideal frequency while the excursion is happening. This leads to a loss in potential performance for workloads whose runtime scales ideally with increased frequency. The reduced frequency of such approaches may also lead to reduced energy efficiency when the resulting power undershoot (as a percentage) is less than the runtime increase that the workload will experience.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
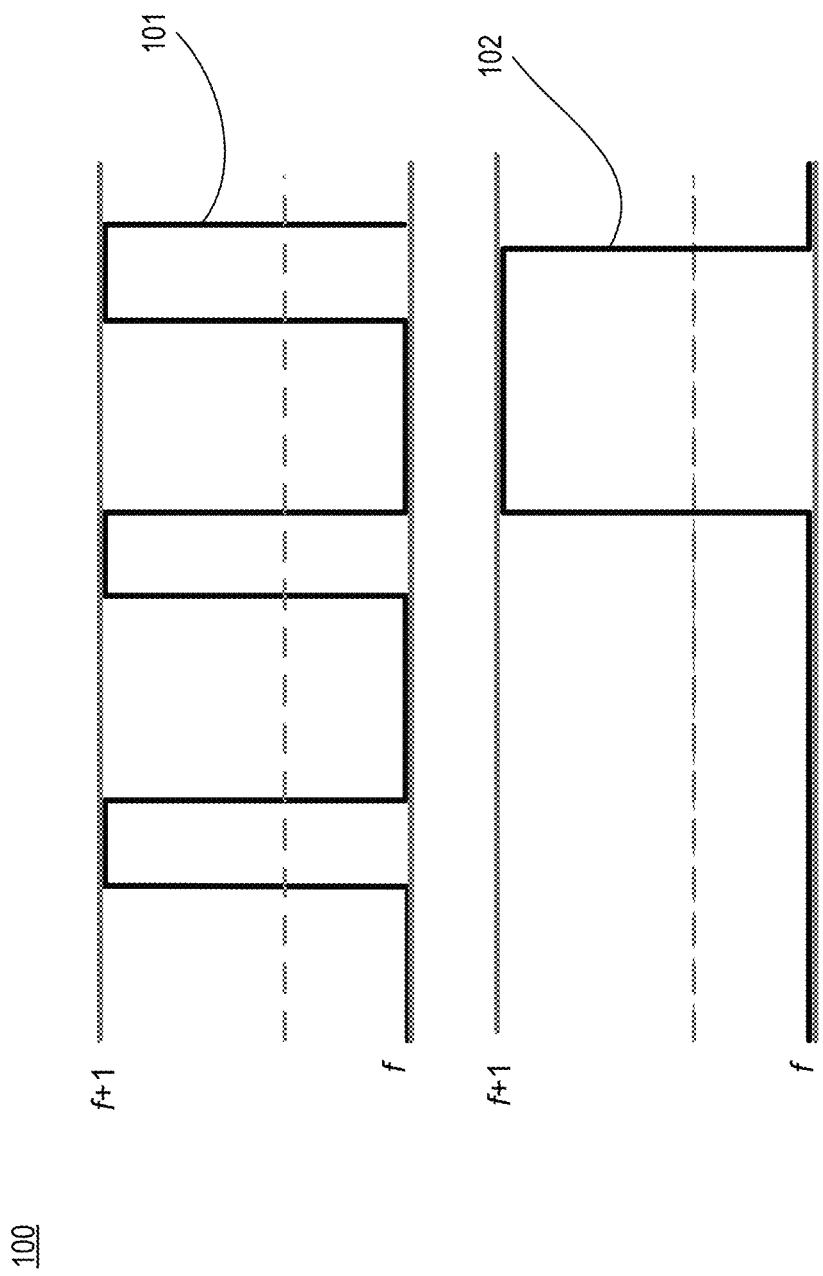
FIG. 1 illustrates waveforms showing pulse width modulation.

One disadvantage of current schemes for limiting power consumption in a processor is that such schemes are not designed to limit power across a pool of heterogeneous compute elements such as a mix of CPUs and GPUs. Such techniques (or schemes) have been based on Single-Input Single-Output (SISO) control systems and thus are not able to adjust the frequency of different compute elements independently. Unfortunately, this limits performance for a large class of computer programs wherein the programs utilize heterogeneous compute elements but require the elements to run at different frequencies for best performance.

Various embodiments improve performance of power-constrained computers comprising a heterogeneous mix of compute elements. An example of a heterogeneous mix of compute elements is a server blade comprising a mix of CPUs and GPUs. Two other examples include a server rack comprising a mix of CPU and GPU blades and an individual SoC (system-on-chip) comprising a mix of CPU cores, GPU cores, or accelerator cores. Various embodiments improve performance of power-constrained computers by dynamically reacting to changes in the switching capacitance that the present workload induces in each heterogeneous compute element and learning the coefficients of a power-frequency model for each compute element for the present workload. At each time step, the scheme of various embodiments forecasts a maximum frequency that the compute element can run at without exceeding an input power limit for a given workload.

In various embodiments, the scheme rapidly re-learns coefficients of the power model and rapidly adapts the frequency as the workload's characteristics shift ensuring that compute elements run at the maximum frequency they can while not exceeding the input power limit. Compared to prior techniques, various embodiments select an ideal frequency a greater percentage of the time (avoiding undershoots), and this leads to higher performance.

The scheme of various embodiments significantly reduces the complexity of calibrating the power capping mechanism in a compute element during manufacturing. For example, various embodiments eliminate free parameters that were historically tuned during the post-silicon debug step in prior compute element designs. Examples of free parameters include coefficients of proportional-integral-derivative (PID) controllers.

The scheme of some embodiments solves the challenge of scaling such that power caps (e.g., limits) are rapidly enforced even in computers where the cap must be enforced among a large pool of heterogeneous compute elements. The computational complexity of the technique scales substantially linearly (or linearly) with the number of compute elements under control.

Some embodiments use a Multiple-Input Multiple-Output (MIMO) control system rather than the SISO control system past techniques employed. This MIMO control system monitors power consumption of each compute element under its control and maximizes each element's (e.g., a CPU) frequency subject to a constraint on the overall power consumed across all compute elements under control. To compute the maximum frequency, the embodiments dynamically learn the coefficients of a power-frequency model for a given workload and select the maximum frequency that stays within an overall input power limit. To minimize the percentage of the time that a sub-optimal frequency is selected, the embodiments estimate the likelihood that a change in switching capacitance or power consumption characteristics has occurred which would invalidate the previously learned coefficients. In some embodiments, the rate of learning increases as belief increases that a change occurred, and the rate of learning decreases as belief decreases that a change occurred.

The flexibility of a MIMO control system allows different types of compute elements (or even different compute elements of the same type) to run at different frequencies. This is advantageous for workloads that tightly couple computation across multiple compute elements because it enables the controller to find the right balance of frequencies across compute elements for the workload. This balance may be distributed across compute elements to optimize various metrics of interest to an end-user, including but not limited to algorithm run-time, energy consumption, or power consumption. Algorithms or heuristics that select this balance may be influenced by signals or flow-control hints present in software, firmware, hardware, or a combination of the three. This can lead to improved performance on these and other metrics with various embodiments compared to prior art.

Some embodiments achieve rapid adaptation by profiling a workload's power consumption while it runs and estimating the likelihood (which is also referred to as "belief") that an event such as a phase change has occurred. When a phase change occurs, power performance parameters such as switching capacitance characteristics as well as the coefficients of the power-frequency model may change abruptly. Using stale coefficients typically leads to frequency decisions that over or under shoot the input power limit. To avoid using stale coefficients and to minimize the duration of excursions, the scheme of various embodiments modulates its rate of learning new model coefficients. In some embodiments, the scheme estimates the belief that there has been a phase change and increases the learning rate as belief increases or decreases the learning rate as belief decreases.

Some embodiments assume a quadratic power-frequency relationship for each compute element:

$$P = C_{dyn} V^2 f + P_{leak}$$

here 'P' is the power consumption of the compute element, $C_{dyn}$ is the dynamic capacitance (also referred to as switching capacitance), V is the voltage that the compute element will operate at for a given frequency, f is the frequency that the compute element will operate at, and $P_{leak}$ is power consumption in the compute element due to leakage in transistor devices. Other embodiments may assume functions of a different form or a different polynomial order to model the relationship between power and frequency.

The scheme of various embodiments performs a linear least-squares fit to this quadratic function using a smoothed online linear least-squares solver. The scheme of some embodiments employs a generalized Kalman filter to detect phase changes in the workload and resulting changes in the power-frequency relationship. This generalized Kalman filter influences the rate of learning in the algorithm. For example, by introducing a historical decay in the computation, the adjustment is realized in the learning rate. In other embodiments, other suitable filters can be used for phase detection and other suitable solvers or methods can be used for fitting the coefficients of the power-frequency model.

In some embodiments, compute elements do not support setting frequencies to continuous values. Rather, they support a discrete and small set of operating frequencies. In modern CPUs and GPUs, for example, these frequency steps may be separated by 100 MHz. Some embodiments use a pulse-width modulator (PWM) block to achieve the target frequency in a compute element on average over a given time period by alternating between supported discrete frequencies.

In some embodiments, a machine-readable storage media is provided having machine readable instructions, that when executed, cause one or more machines to perform a method comprising: estimating power, for a compute element, based on a current power model; reading actual power consumption of the compute element; performing weighted regression based on a difference between the actual power consumption and the estimated power; modifying the current power model based on the weighted regression; and determining a target frequency based on the modified current power model. In some embodiments, performing the weighted regression comprises applying a linear-least squares regression. In some embodiments, reading the actual power consumption of the compute element comprises reading power measurement from a power measurement hardware. In some embodiments, the target frequency is a maximum frequency that the compute element can operate at while being within a power limit.

In some embodiments, the method comprises transmitting the target frequency to a power management system or another device. In some embodiments, the compute element is a heterogeneous compute element. In some embodiments, estimating the power comprises determining switching capacitance characteristics of the compute element. In some embodiments, modifying the current power model based on the weight regression, comprises re-learning coefficients of the current power model, as workload characteristics for the compute element shift, to ensure that the compute element operates at the target frequency. In some embodiments, the method comprises applying a generalized Kalman filter to detect phase changes in the workload.

In some embodiments, the compute element is a first compute element, wherein the machine-readable storage media has machine readable instructions, that when executed, cause the one or more machines to perform a further method comprising estimating power, for a second compute element, based on a current power model of the second compute element; reading actual power consumption of the second compute element; performing weighted regression based on a difference between the actual power consumption and the estimated power associated with the second compute element; modifying the current power model of the second compute element based on the weighted regression associated with the second compute element and weighted regression associated with the first compute element; and determining a second target frequency, based on the modified current power model, for the second compute element.

There are many technical effects of the various embodiments. For example, with the MIMO power-capping scheme of various embodiments, computer users enjoy higher performance when the computer is power constrained. Data centers also benefit from lower capital costs because the scheme of various embodiments reduces power limit excursion times, and this enables Data Centers to buy lower-cost power delivery infrastructure. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and I/O driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

FIG. 1 illustrates a set of waveforms 100 showing pulse width modulation. Both waveforms 101 and 102 result in the same average frequency over time, but they differ in the number of frequency transitions incurred. In various embodiments, the target frequency (e.g., the maximum frequency that the compute element can run at without exceeding the input power limit) is computed using the power-frequency model and passed to the PWM block. The PWM block of some embodiments determines the discrete frequencies ($f_{low}$, $f_{hi}$) that bound the target frequency (f) above and below then alternates the compute element's frequency settings between $f_{low}$ and $f_{hi}$ with a suitable duty cycle to achieve the target frequency, on average, over a given time period. In some embodiments, a parameter N_PWM_STEPS in a PWM logic block defines the rate with which the PWM logic block should alternate between $f_{low}$ and $f_{hi}$ over a given time period. The parameter can be used to minimize frequency transitions in some CPU or GPU designs where frequent transitions would result in degraded performance.

Figure 2:
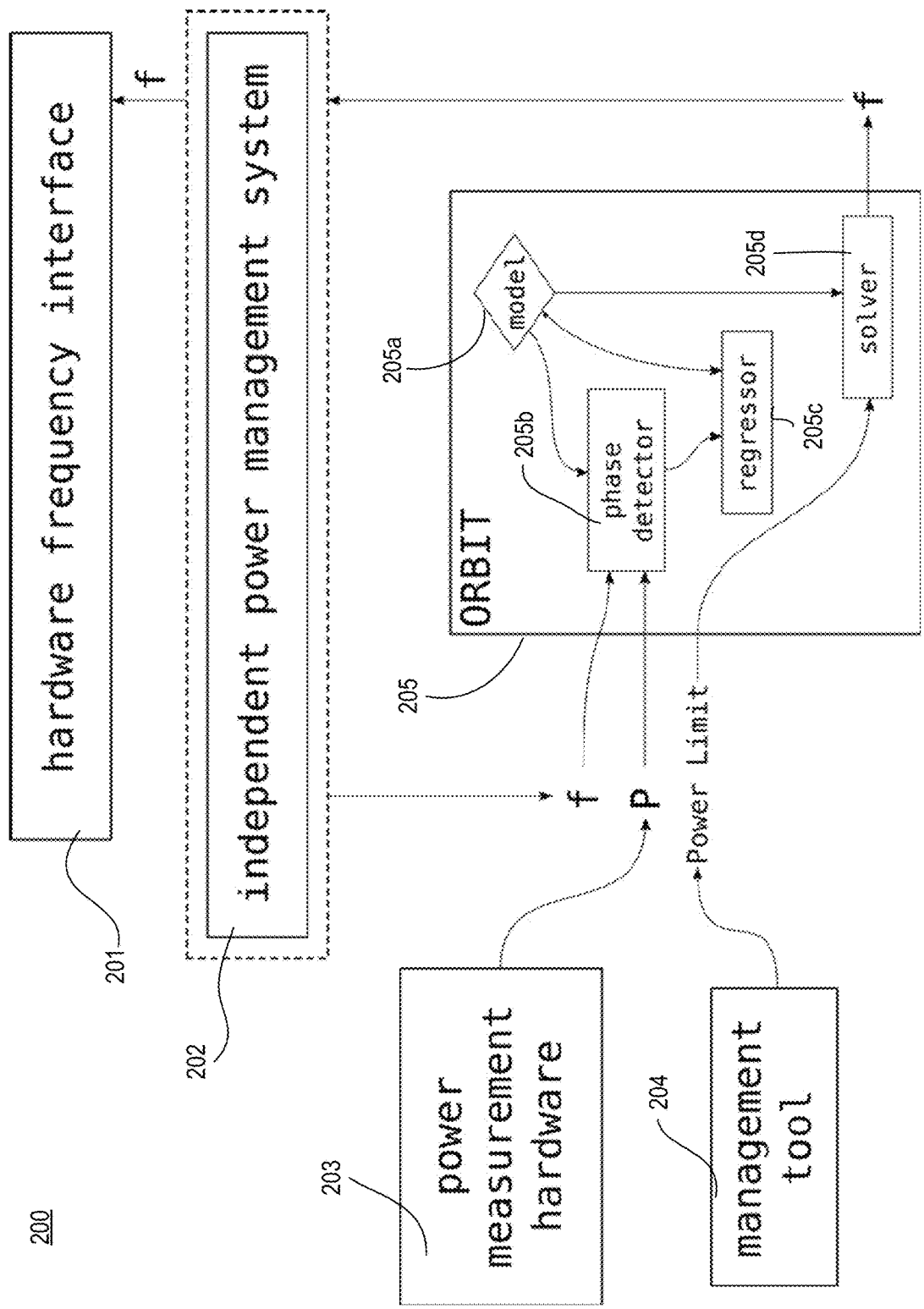
FIG. 2 illustrates a high-level framework of a scheme for workload aware power limiting and multiple-input multiple-output control, in accordance with some embodiments.

FIG. 2 illustrates a high-level framework 200 of a scheme for workload aware power limiting and multiple-input multiple-output (MIMO) control, in accordance with some embodiments. Framework 200 comprises hardware frequency interface 201, independent power management system 202 (e.g., p-unit), power measurement logic 203 (e.g., current sensor, voltage sensor, and/or operating frequency counters), management tool 204 (e.g., part of p-unit or firmware), and MIMO control 205 (herein also referred to as ORBIT). The high-level framework depicts the inputs, outputs, and internal components of the scheme. The framework can be implemented or embodied in hardware circuits, firmware running within the compute element, system software, and/or a combination of them. Some embodiments may include independent power management systems that interact with the high-level framework such as a heretical power management system (HPM) described with reference to FIG. 5.

Referring back to FIG. 2, in some embodiments, the power limit is inputted to ORBIT 205, by software, hardware, or a combination of them. In some embodiments, power measurements (P) are obtained from power measurement logic 203 which can be hardware, software, or a combination of them. In some embodiments, ORBIT 205 includes a power model 205a, phase detector 205b, regressor 205c, and solver 205d.

In some embodiments, the linear-least squares regression mentioned herein is performed in regressor block 205c within ORBIT. In some embodiments, the generalized Kalman filter mentioned herein is applied within phase detector 205b. In some embodiments, regressor block 205c and phase detector block 205b update the coefficients of power model 205a ($P=C_{dyn}V^2f+P_{leak}$) mentioned herein. In some embodiments, solver 205d takes in model 205a and the power limit from management tool 204 (e.g., software) and computes the maximum frequency that the compute element can run at while staying within the power limit. In some embodiments, the computed frequency (f) is outputted externally by solver 205d.

In some embodiments without an independent power management system 202, the frequency 'f' outputted by ORBIT 205 is routed directly to the compute element's interface for setting frequency. In other embodiments that do have optional independent power management, the frequency 'f' is routed to independent power management system 202 (e.g., power control unit (PCU)) instead, and the frequency 'f' is treated as a suggestion rather than a final decision. In some embodiments, independent power management system 202 may choose to honor or override the suggested frequency, and ORBIT 205 operates successfully even if an override occurs.

One example scenario where an override may be helpful is if independent power management system 202 is responsible for regulating the compute element's frequency to stay within a different set of constraints besides power consumption limits. For example, some compute elements may have constraints on the maximum current they can draw or the maximum temperature they can sustain before to prevent operational errors or hardware failures.

Described here is an example pseudocode for the operation of ORBIT 205. This example pseudocode assumes that ORBIT 205 applies pulse width modulation (PWM) on the compute element's frequency settings to achieve the target frequency. It also assumes a simpler power model than the equation given above ($P=C_{dyn}V^2f+P_{leak}$). It assumes that power is a quadratic function of frequency (not voltage). However, the embodiments are not limited to this simplified model. Other models may be used too. In various embodiments, the simplified model may be used when the voltage is not known:

```
Parameters (possibly exposed to software)
  σ: a constant representing expected error in power measurement
  s: smoothing factor (0-1)
  N_PWM_STEPS: the width of the PWM loop
Memory
  A: a 3 × 3 matrix
  b: a 3-dimensional vector
  PWM_INDEX: an integer
  STATUS: a Boolean
Variables
  X: frequency (the input to quadratic fit, without coefficients)
  P̂: power estimate
  ξ: "predictability", i.e. how close measured power is to
  our expectation
ControlLoop(last iteration's frequency f, consumed power P,
power limit PL)
  X ← (f², f, 1) // quadratic kernel
  P̂ ← A⁻¹ b · X // our estimate of power
  ξ ← 1/(1 +(P̂ - P) /σ )       // predictability
  A ← ξ A, b ← ξ b     // discount both A and b by predictability
  A ← A + XᵀX// A is sum of the outer products of the X
  b ← b + XP    // b is the sum of the X weighted by P
  a₂, a₁, a₀ ← (A + s A₀)⁻¹(b + sb₀)
Solver:
// compute the highest permissible frequency
  f ← (-a₁ + (a₁² - 4a₂(a₀ - PL))^(1/2))/2a₂
  if f> P₁:    // clip target if it exceeds max (P₁)
    f ← P₁
  f_low ← f    // initialize then perform PWM
  if PWM_INDEX = 0:
    PWM_INDEX ← N_PWM_STEPS
    STATUS ← 0
    P_low ← a₂ f_low² + a₁ flow + a₀
    P_hi ← a₂ (f_low + 1)² + a₁ (f_low + 1) + a₀
    C ← (PL - P_low)/(P_hi - P_low) × N_PWM_STEPS
  else if PWM_INDEX < C:
    STATUS ← 1
  PWM_INDEX ← PWM_INDEX-1
  if STATUS = 1:
    return f_low + 1
  else:
    return f_low
End
```

Figure 3:
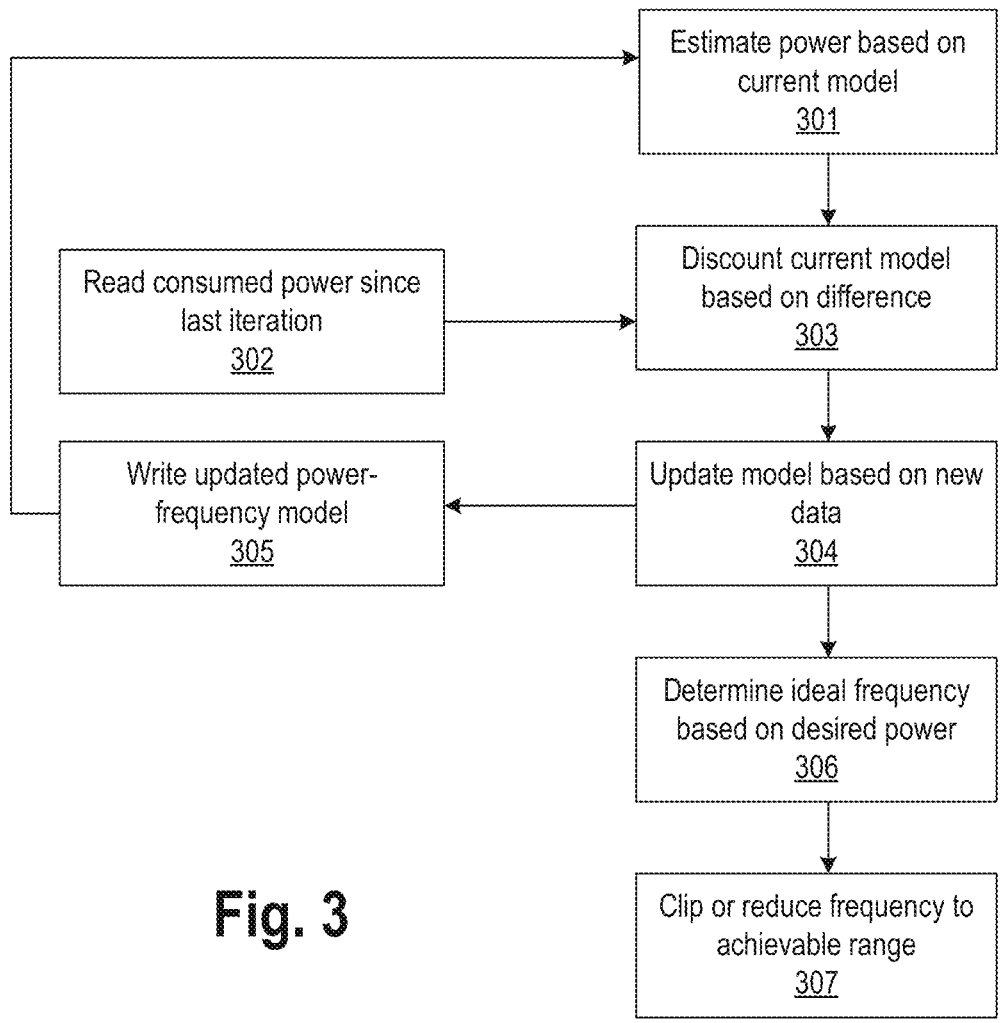
FIG. 3 illustrates a flowchart of a method of workload aware power limiting and multiple-input multiple-output control, in accordance with some embodiments.

FIG. 3 illustrates flowchart 300 of a method of workload aware power limiting and multiple-input multiple-output control, in accordance with some embodiments. While the blocks of the flowchart are shown in a particular order, some blocks can be performed before others, and some blocks (or operations) can be performed in parallel or simultaneously.

Upon starting the process, at block 301, power is estimated based on the power model ($P=C_{dyn}V^2f+P_{leak}$). At block 302, the process reads consumed power since last iteration 302 and provides to block 303. At block 303, the process discounts the current model based on a difference between power consumed since the last iteration of this process and the current estimated power.

At block 304, the process then updates the model coefficients using weighted regression to incorporate the dis-counting factor. For example, when ORBIT 205 concludes that there is no difference in power consumed since the last iteration and the current estimated power, it will use a weight of '1' (no discount). If the difference is large, however, the weight will approach '0' (a total discount). The weight determines how much the new values computed for the model coefficients will depend on new data versus past data: a weight of '0' corresponds to complete bias toward new data, a weight of '1' corresponds to complete bias toward existing data, and values between '0' and '1' incorporate both new and existing data to various degrees. At block 305, the updated power frequency model is written to memory (e.g., in p-unit 202/203). The process then proceeds to block 301 indicating that the model is iteratively updated.

After the process updates the model coefficients, it then at block 306 the process uses the model to determine the target frequency 'f' for the compute element, which will approach but not exceed the desired power limit. The process may include figuring out how to distribute power based on heuristic. This decision may be made by software, firmware, hardware, or a combination of the three. If the target exceeds the maximum frequency supported by the compute element, the frequency is clipped to the maximum as indicated by block 307. This target frequency is then passed to an independent power management system 202/203 (or another device) or directly to the compute element's interface for setting frequency. In various embodiments, as mentioned, PWM may be applied to the frequency that is outputted to achieve the desired target frequency on average, over time.

Flowcharts of FIGS. 2-3 can be performed by hardware, software, or a combination of both. For example, the flowchart can be performed by memory power control unit logic or particular finite state machine implemented in hardware.

Elements of embodiments (e.g., schemes described with reference to various figures) are also provided as a machine-readable medium (e.g., memory) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together as shown.

In some embodiments, a processor is a Digital Signal Processor (DSP), an Application Specific Integrated Circuit (ASIC), a general-purpose Central Processing Unit (CPU), or a low power logic implementing a simple finite state machine to perform the method of various embodiments, etc.

In some embodiments, the various logic blocks are coupled via network bus. Any suitable protocol may be used to implement network bus. In some embodiments, machine-readable storage medium includes instructions (also referred to as the program software code/instructions) for calculating or measuring distance and relative orientation of a device with reference to another device as described with reference to various embodiments and flowchart.

Program software code/instructions associated with flowcharts of FIGS. 2-3 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts of FIGS. 2-3 (and/or various embodiments) are executed by the system.

In some embodiments, the program software code/instructions associated with flowcharts 200/300 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer-to-peer networks and the like, including the Internet. Different portions of the software program code/instructions and data can be obtained at different times and in different communication sessions or in the same communication session.

The software program code/instructions (associated with flowcharts of FIGS. 2-3 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine-readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine-readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

The logic in various embodiments can be lumped in a single logic or multiple logic. The logic can be implemented as hardware circuitries, software routines, firmware, operating system, and a combination of any of them.

Figure 4A:
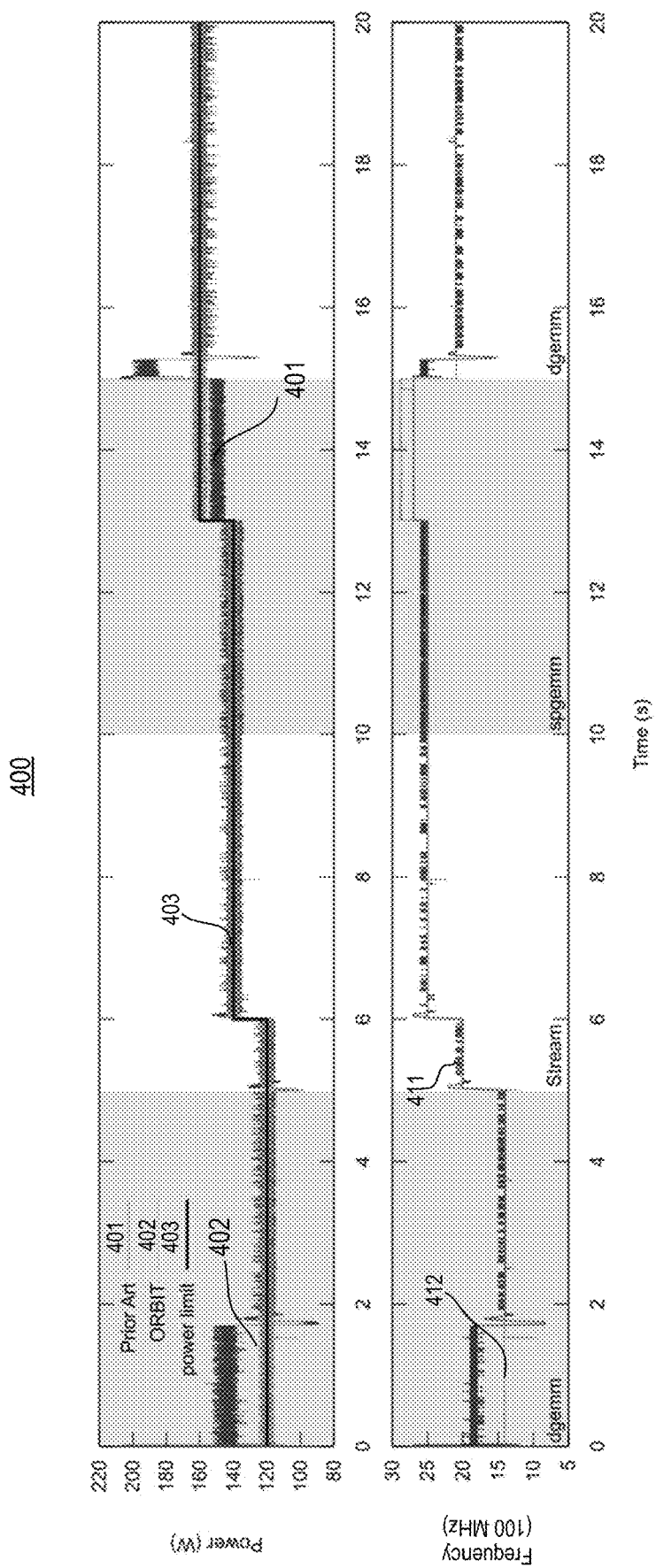
FIGS. 4A-B illustrate simulation waveforms showing performance of the scheme, in accordance with various embodiments.
Figure 4B:
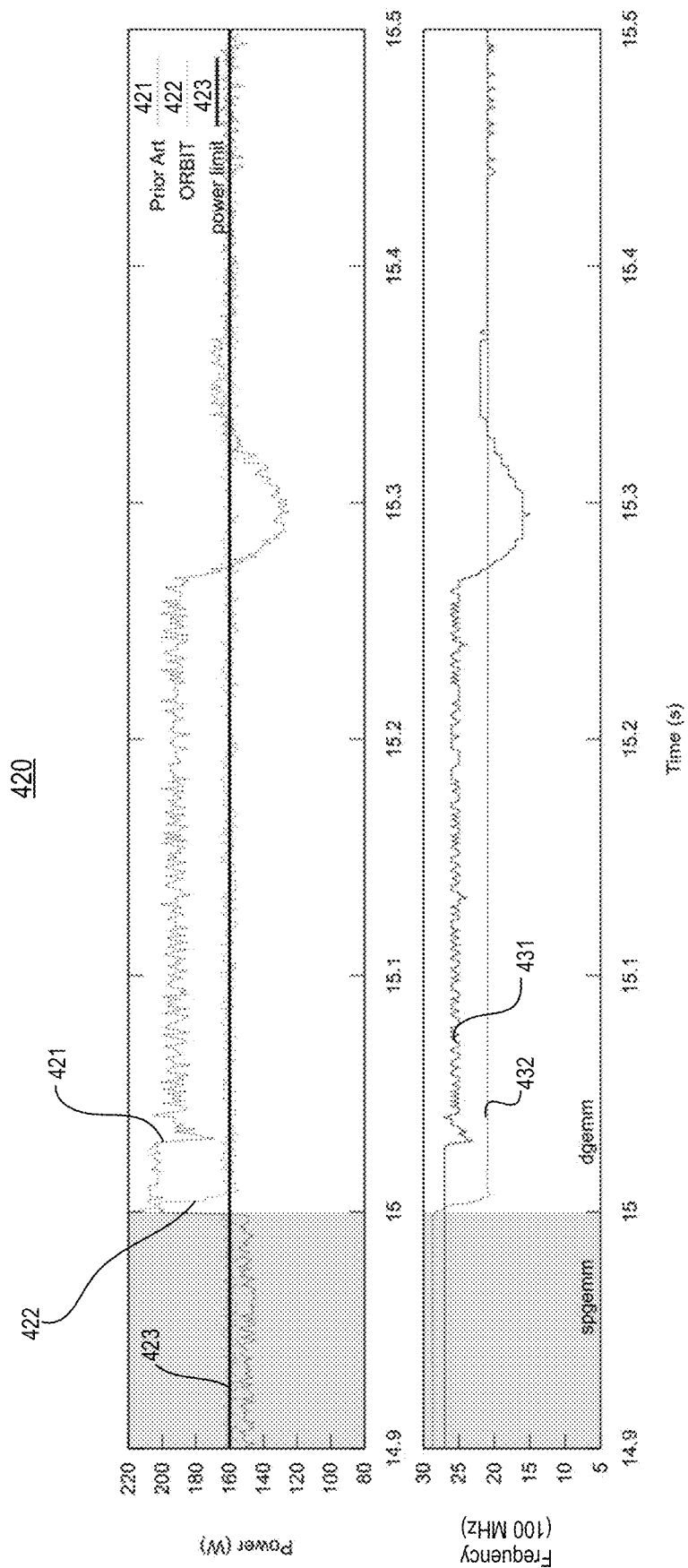

FIGS. 4A-B illustrate simulation waveforms 400 and 420, respectively, showing performance of the scheme, in accordance with various embodiments. To demonstrate the benefits of ORBIT 205 versus a prior art power capping technique, a simulator can be used to simulate their behavior on a typical CPU.

Details of the experimental setup are as follows. The simulator takes frequency as an input from ORBIT 205 or the prior art power capping technique at each time step and outputs the resulting power consumption of the CPU. Power capping techniques in ORBIT take the power limit as an input and chooses frequency accordingly to stay within the limit. The simulator supports several workloads and takes, as input, the type of workload that is running during a given time step. CPU power is a function of the workload that is running and the input frequency. For each workload and input frequency, the simulator estimates power based on fits of data collected on real CPU during an offline simulator calibration step. During initialization of the simulation, a uniform frequency is set across all cores on the CPU.

To simplify the simulation, the simulator holds the CPU uncore logic to a fixed frequency, varying only the CPU core frequency according to the request from ORBIT or the prior art power capping technique. Similarly, memory (e.g., DRAM) power management is not modeled. The power output of the simulator includes power from the CPU cores, uncore logic, and memory logic, however. The prior art technique and the scheme of various embodiments are compared under a variety of scenarios including: constant power conditions, varying power limits, and varying workload. The latter simulates phase-like behavior in a complex computer program.

The workloads supported in the simulator and used in the experiments include:
DGEMM
SpGEMM
STREAM
CoMD
AMG
FFT The simulation assumes that the prior art technique and the scheme of various embodiments run with a control time step interval of 1 ms. Sample error is set as an input parameter to simulation. Here, the default assumption is an error of $\Delta P=10$ W.

In the upper plot of FIG. 4A, the technique of various embodiments 402 is compared to the prior art technique 401 with both approaches configured to enforce power limit 403 over a time window of 1 s.

The input power limit 403 to the power capping techniques is changed twice: once at t=6 s and once at t=13 s. The workload undergoes multiple phase changes throughout execution: once at t=5 s, once at t=10 s, and once at t=15 s. Power consumption when using the prior art technique is shown as 401. Power consumption when using the scheme of various embodiments is shown as 402. FIG. 4A shows that the scheme of various embodiments seamlessly tracks changes in the input power limit, changes in the phase (and associated switching capacitance in the processor), and it reduces the duration of excursions away from the input power limit.

The bottom plot of FIG. 4A compares the discrete frequency (e.g., P-state) selected by the prior art technique 411 versus the scheme of various embodiments 412 at each control time step. FIG. 4A shows that the input power limit remains 120 W after the first phase change from DGEMM to STREAM at t=5 s, and both methods select a higher operating frequency for STREAM than for DGEMM at the 120 W limit. This is because the switching capacitance and power consumption of the STREAM phase is lower; a higher frequency can be reached before the 120 W budget is reached. At the second phase change at t=10 s, the selected frequency is roughly the same for STREAM and SPGEMM. At the third phase change at t=15 s, both methods choose a lower frequency for DGEMM than they did for SPGEMM. This is because the switching capacitance and power consumption of DGEMM is higher and the power budget (i.e. 160 W in this case) is reached at a lower frequency.

FIG. 4B shows zoomed moments just after the phase change at t=15 s. FIG. 4B shows that the prior art technique 421 first exhibits a substantially longer excursion beyond the power limit than the various embodiments 422 does after this phase change. As mentioned previously, as excursions over the power limit 423 increase in duration, more and more costly power delivery infrastructure is required to tolerate them.

Right after the excursion beyond the power limit 423, the prior art technique 421 exhibits an excursion to power limit 423. During this excursion, in the bottom sub-figure of FIG. 4B, the prior art technique 431 selects a frequency below the maximum frequency that the processor can run at theoretically without exceeding the 160 W power limit. As mentioned previously, when the control system selects a frequency below the maximum theoretical frequency some potential performance is lost. Using the scheme of various embodiments 432, excursions at the t=15 s phase change are much shorter: the last just a single control time step interval (i.e. 1 ms). Note, that the prior art technique exhibits another excursion and loss of potential performance at the t=6 s change in the input power limit.

Figure 5:
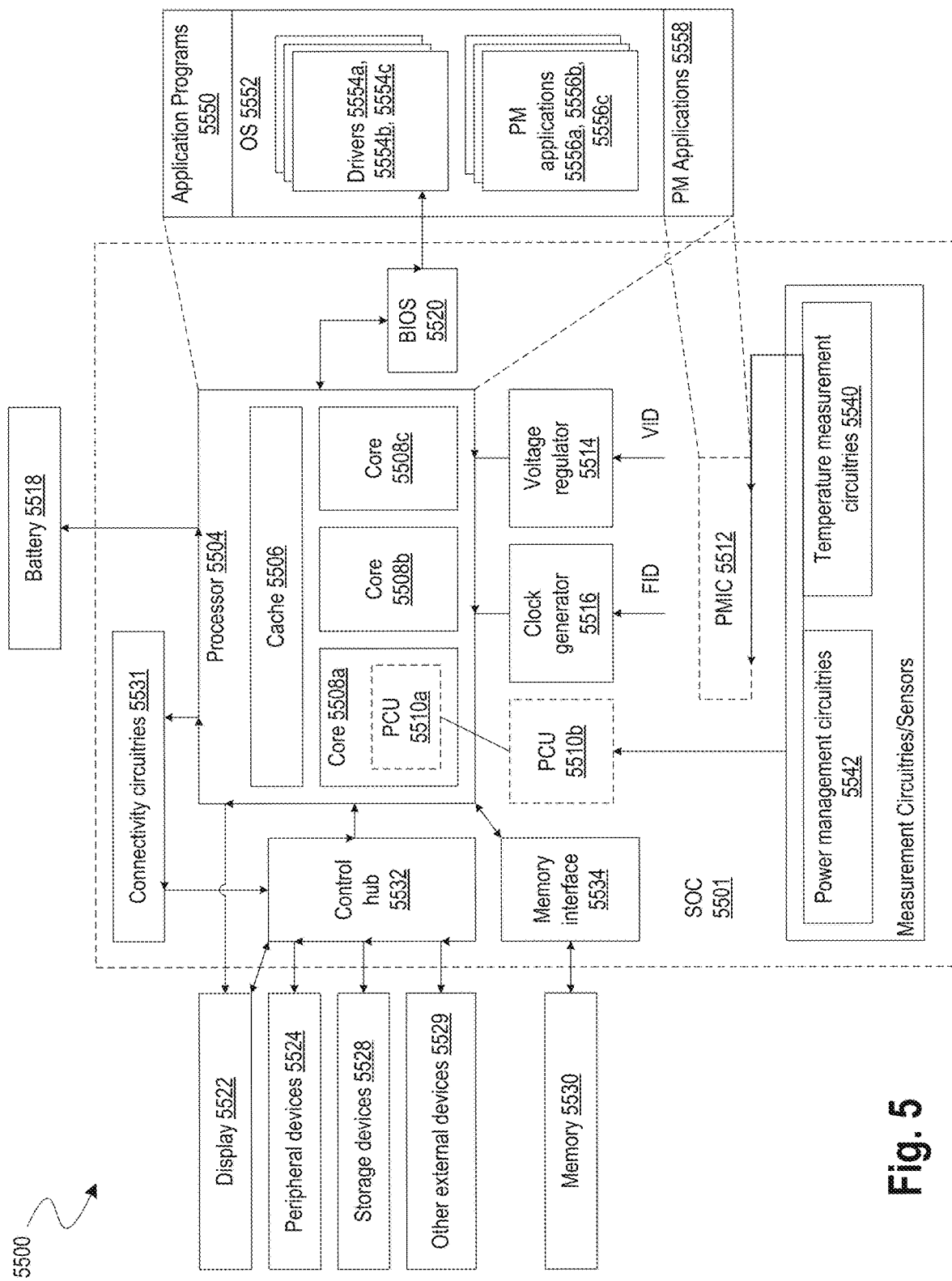
FIG. 5 illustrates a smart device or a computer system or a SoC (System-on-Chip) with workload aware power limiting and multiple-input multiple-output control, in accordance with some embodiments.

FIG. 5 illustrates a smart device or a computer system or a SoC (System-on-Chip) with workload aware power limiting and multiple-input multiple-output control, in accordance with some embodiments. It is pointed out that those elements of FIG. 5 having the same reference numbers (or names) as the elements of any other figure may operate or function in any manner similar to that described, but are not limited to such.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 5, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing means. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 5, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2 (L2) cache, level 3 (L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, VR 5514 includes a one-shot inductor current scheme which comprises a controller to generate a signal to control a high-side switch and a low-side switch such that the high-side switch remains turned on beyond a turn-on time if a voltage level on an output supply rail remains below a reference. The scheme reduces the minimum operating voltage Vmin and/or frequency guardband of SoC 5501.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510a. In an example, some other sections of PCU 5510 may be implemented outside the processing cores 5508, and these sections of PCU 5510 are symbolically illustrated using a dotted box and labelled as PCU 5510b. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee 105. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., C0 state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU 5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556*a*, 5556*b*, 5556*c*. The OS 5552 may also include various drivers 5554*a*, 5554*b*, 5554*c*, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510*a/b* has a capability to enable extra compute and telemetries resources for the runtime support of the pCode. Here pCode refers to a firmware executed by PCU 5510*a/b* to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc, th) based on the available battery power (which changes slowly) and set the SoC throttling peak power (Psoc, th). In some embodiments, pCode decides the frequencies and voltages based on Psoc, th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: A machine-readable storage media having machine readable instructions, that when executed, cause one or more machines to perform a method comprising: estimating power, for a compute element, based on a current power model; reading actual power consumption of the compute element; performing weighted regression based on a difference between the actual power consumption and the estimated power; modifying the current power model based on the weighted regression; and determining a target frequency based on the modified current power model.

Example 2: The machine-readable storage media of claim 1, wherein performing the weighted regression comprises applying a linear-least squares regression.

Example 3: The machine-readable storage media of claim 1, wherein reading the actual power consumption of the compute element comprises reading power measurement from a power measurement hardware.

Example 4: The machine-readable storage media of claim 1, wherein the target frequency is a maximum frequency that the compute element can operate at while being within a power limit.

Example 5: The machine-readable storage media of claim 1 having machine readable instructions, that when executed, cause the one or more machines to perform a further method comprising: transmitting the target frequency to a power management system or another device.

Example 6: The machine-readable storage media of claim 1, wherein compute element is a heterogeneous compute element.

Example 7: The machine-readable storage media of claim 1, wherein estimating the power comprises determining switching capacitance characteristics of the compute element.

Example 8: The machine-readable storage media of claim 1, wherein modifying the current power model based on the weight regression, comprises: re-learning coefficients of the current power model, as workload characteristics for the compute element shift, to ensure that the compute element operates at the target frequency.

Example 9: The machine-readable storage media of claim 8 comprises applying a generalized Kalman filter to detect phase changes in the workload.

Example 10: The machine-readable storage media of claim 1, wherein the compute element is a first compute element, wherein the machine-readable storage media has machine readable instructions, that when executed, cause the one or more machines to perform a further method comprising: estimating power, for a second compute element, based on a current power model of the second compute element; reading actual power consumption of the second compute element; performing weighted regression based on a difference between the actual power consumption and the estimated power associated with the second compute element; modifying the current power model of the second compute element based on the weighted regression associated with the second compute element and weighted regression associated with the first compute element; and determining a second target frequency, based on the modified current power model, for the second compute element.

Example 11: An apparatus comprising: a power measurement hardware comprising one or more sensors to measure power of a compute element; and logic coupled to the power management hardware, wherein the logic is to: estimate power, for the compute element, based on a current power model; read actual power consumption of the compute element; perform weighted regression based on a difference between the actual power consumption and the estimated power; modify the current power model based on the weighted regression; and determine a target frequency based on the modified current power model.

Example 12: The apparatus of claim 11, wherein the logic is to apply a linear-least squares regression to perform the weighted regression.

Example 13: The apparatus of claim 11, wherein logic is to read power measurement from the power measurement hardware to read the actual power consumption of the compute element.

Example 14: The apparatus of claim 11, wherein the target frequency is a maximum frequency that the compute element can operate at while being within a power limit.

Example 15: The apparatus of claim 11, wherein the logic is to transmit the target frequency to a power management system or another device.

Example 16: The apparatus of claim 11, wherein compute element is a heterogeneous compute element.

Example 17: The apparatus of claim 11, wherein the logic is to determine switching capacitance characteristics of the compute element to estimate the power.

Example 18: The apparatus of claim 11, wherein to modify the current power model based on the weight regression, the logic is to re-learn coefficients of the current power model, as workload characteristics for the compute element shift, to ensure that the compute element operates at the target frequency.

Example 19: A system comprising: a memory; a processor system coupled to the memory; a wireless interface to allow the processor system to communicate with another device, the processor system including: a power measurement hardware comprising one or more sensors to measure power of a compute element; and logic coupled to the power management hardware, wherein the logic is to: estimate power, for the compute element, based on a current power model; read actual power consumption of the compute element; perform weighted regression based on a difference between the actual power consumption and the estimated power; modify the current power model based on the weighted regression; and determine a target frequency based on the modified current power model.

Example 20: The system of claim 19, wherein the logic is to apply a linear-least squares regression to perform the weighted regression, and wherein logic is to read power measurement from the power measurement hardware to read the actual power consumption of the compute element.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A non-transitory machine-readable storage medium having machine readable instructions, that when executed, cause one or more machines to perform a method comprising:
    operating a compute element at a target frequency in a last iteration of a power limiting process;
    estimating a power consumption for the compute element in the last iteration based on a power-frequency model in which the estimated power consumption is a function of the target frequency and one or more coefficients of the power-frequency model;
    reading an actual power consumption of the compute element;
    determining a discounting factor based on a difference between the actual power consumption and the estimated power consumption;
    modifying the power-frequency model based on the discounting factor, wherein the modifying comprises discounting past values for the one or more coefficients based on the discounting factor, and the discounting is larger when the difference between the actual power consumption and the estimated power consumption in the last iteration is larger;
    updating the target frequency based on the modified power-frequency model; and
    operating the compute element at the updated target frequency in a next iteration of the power limiting process.

2. The non-transitory machine-readable storage medium of claim 1, wherein the modifying of the power-frequency model comprises performing a weighted regression which incorporates the discounting factor.

3. The non-transitory machine-readable storage medium of claim 1, wherein the reading of the actual power consumption of the compute element comprises reading a power measurement from power measurement hardware.

4. The non-transitory machine-readable storage medium of claim 1, wherein:
the target frequency in the last iteration is a maximum frequency at which the compute element can operate without the actual power consumption of the compute element exceeding a power limit; and
the target frequency in the next iteration is a maximum frequency at which the compute element can run without the actual power consumption of the compute element exceeding the power limit.

5. The non-transitory machine-readable storage medium of claim 1 wherein the method performed further comprises:
transmitting the target frequency to a power management system or another device.

6. The non-transitory machine-readable storage medium of claim 1, wherein the compute element is in a heterogeneous mix of compute elements, and a target frequency is set for each compute element according to a respective power-frequency model.

7. The non-transitory machine-readable storage medium of claim 1, wherein the estimating of the power consumption comprises determining a switching capacitance characteristic of the compute element.

8. The non-transitory machine-readable storage medium of claim 1, wherein the modifying of the power-frequency model comprises:
re-learning the one or more coefficients of the power-frequency model, as workload characteristics for the compute element shift, to ensure that the compute element operates at the updated target frequency.

9. The non-transitory machine-readable storage medium of claim 8, wherein the method performed further comprises applying a generalized Kalman filter to detect phase changes in the workload.

10. The non-transitory machine-readable storage medium of claim 1, wherein the compute element is in a computing device, and the method performed further comprises:
determining a target frequency for another compute element of the computing device based on a power-frequency model of the another compute element.

11. An apparatus, comprising:
power measurement hardware comprising one or more sensors to measure an actual power consumption of a compute element; and
a circuit coupled to the power measurement hardware, wherein the circuit is to:
estimate a power consumption for the compute element based on a power-frequency model in which the estimated power consumption of the compute element is a function of a target frequency and one or more coefficients of the power-frequency model;
read the actual power consumption of the compute element from the power measurement hardware;
determine a discounting factor based on a difference between the actual power consumption and the estimated power consumption;
modify the power-frequency model based on the discounting factor, wherein to modify the power-frequency model, the circuit is to discount past values for the one or more coefficients based on the discounting factor, and the discounting is larger when the difference between the actual power consumption and the estimated power consumption is larger;
update the target frequency based on the modified power-frequency model; and
operate the compute element at the updated target frequency.

12. The apparatus of claim 11, wherein to modify the power-frequency model, the circuit is to perform a weighted regression which incorporates the discounting factor.

13. The apparatus of claim 11, wherein the updated target frequency is a maximum frequency that the compute element can operate at while being within a power limit.

14. The apparatus of claim 11, wherein the circuit is to transmit the updated target frequency to a power management system or another device.

15. The apparatus of claim 11, wherein the compute element is in a heterogeneous mix of compute elements, and a target frequency is set for each compute element according to a respective power-frequency model.

16. The apparatus of claim 11, wherein the circuit is to determine a switching capacitance characteristic of the compute element to estimate the power consumption.

17. The apparatus of claim 11, wherein to modify the power-frequency model, the circuit is to re-learn the one or more coefficients of the power-frequency model, as workload characteristics for the compute element shift, to ensure that the compute element operates at the target frequency.

18. A system, comprising:
a memory to store instructions; and
a processor coupled to the memory, wherein the processor is to execute the instructions to:
operate a compute element at a target frequency in a last iteration of a power limiting process;
estimate a power consumption for the compute element in the last iteration based on a power-frequency model in which a power consumption of the compute element is a function of the target frequency of the compute element;
read an actual power consumption of the compute element;
determine a discounting factor based on a difference between the actual power consumption and the estimated power consumption;
modify the power-frequency model based on the discounting factor;
update the target frequency based on the modified power-frequency model; and
operate the compute element at the updated target frequency in a next iteration of the power limiting process.

19. The system of claim 18, wherein to modify the power-frequency model, the processor is to execute the instructions to perform a weighted regression which incorporates the discounting factor.

20. The system of claim 18, wherein:
the estimated power consumption of the compute element is a function of one or more coefficients of the power-frequency model;
to modify the power-frequency model, the processor is to execute the instructions to discount past values for the one or more coefficients based on the discounting factor; and
the discount is larger when the difference between the actual power consumption and the estimated power consumption in the last iteration is larger.

* * * * *